US009637896B2

(12) United States Patent
Tempel

(10) Patent No.: US 9,637,896 B2
(45) Date of Patent: May 2, 2017

(54) JET REGULATOR COMPRISING AN IMPINGEMENT SURFACE HAVING RING WALLS

(71) Applicant: Neoperl GmbH, Mullheim (DE)

(72) Inventor: Marc Tempel, Freiburg (DE)

(73) Assignee: Neoperl GmbH, Müllheim (DE)

( * ) Notice: Subject to any disclaimer, the term of this patent is extended or adjusted under 35 U.S.C. 154(b) by 0 days.

(21) Appl. No.: 14/768,517

(22) PCT Filed: Feb. 7, 2014

(86) PCT No.: PCT/EP2014/000343
§ 371 (c)(1),
(2) Date: Aug. 18, 2015

(87) PCT Pub. No.: WO2014/139618
PCT Pub. Date: Sep. 18, 2014

(65) Prior Publication Data
US 2016/0002897 A1   Jan. 7, 2016

(30) Foreign Application Priority Data

Mar. 11, 2013 (DE) .................... 20 2013 002 282 U

(51) Int. Cl.
*E03C 1/08* (2006.01)
*E03C 1/084* (2006.01)
*G05D 7/01* (2006.01)

(52) U.S. Cl.
CPC ................ *E03C 1/08* (2013.01); *E03C 1/084* (2013.01); *G05D 7/012* (2013.01)

(58) Field of Classification Search
CPC E03C 1/08; E03C 1/084; G05D 7/012; B05B 1/3426; B05B 1/3006
(Continued)

(56) References Cited

U.S. PATENT DOCUMENTS 2,998,928 A   9/1961  Aghnides
3,363,841 A   1/1968  Aghnides
(Continued)

FOREIGN PATENT DOCUMENTS

DE   202010007835   11/2011
DE   102012021361   11/2013
(Continued)

*Primary Examiner* — Davis Hwu
(74) *Attorney, Agent, or Firm* — Volpe and Koenig, P.C.

(57) ABSTRACT

A jet regulator (1), having a perforated plate (5) arranged therein with throughflow holes (6) extending through the perforated plate for dividing the water flowing therethrough, including a central, non-perforated impingement surface (14) on the perforated plate (5), which non-perforated impingement surface is surrounded by a first annular wall (15), which has passage openings (16) that are oriented in a radial direction and extend through the first annular wall, wherein a respective throughflow hole (6), which extends through the perforated plate (5) and is connected to the respective passage opening (16), is provided on the side of each passage opening (16) arranged in the impingement surface plane. The annular wall (15) is surrounded by an annular ring chamber (29) on the outer circumferential side. A flow regulator (30) or a throttling device (300) is provided in front of the impingement surface (14) in the flow direction of the water, whereby the water consumption is restricted and/or the water flow rate becomes largely independent of the particular water pressure. Furthermore, a second annular wall (33), which has a smaller diameter than the first annular wall and is arranged at a distance from the first annular wall, is provided coaxially and concentrically to the first annular wall (15), which second annular wall has radial passage openings (34) arranged at a distance above the impingement surface (14), through which radial passage openings the water has access to the first annular wall (15) and to the passage openings (16) of the first annular wall and thus to (Continued)

the throughflow holes (6). Through this combination, the water flow rate through the jet regulator becomes practically independent of the water pressure upstream of the jet regulator (1).

14 Claims, 6 Drawing Sheets

(58) Field of Classification Search
USPC .................................... 239/428.5, 596, 569
See application file for complete search history.

(56) References Cited

U.S. PATENT DOCUMENTS

| | | | |
|---|---|---|---|
| 3,851,825 A | 12/1974 | Parkison et al. | |
| 7,311,272 B2 * | 12/2007 | Ito | B41J 2/14209 |
| | | | 239/533.14 |
| 2010/0147397 A1 * | 6/2010 | Zoller | G05D 7/012 |
| | | | 137/115.13 |
| 2011/0017322 A1 * | 1/2011 | Zoller | G05D 7/0133 |
| | | | 137/503 |
| 2013/0082121 A1 | 4/2013 | Stein et al. | |

FOREIGN PATENT DOCUMENTS

| | | |
|---|---|---|
| DE | 102012021361 | 5/2014 |
| FR | 2677687 | 12/1992 |
| NL | 122340 | 12/1966 |
| WO | 2013004181 | 1/2013 |

* cited by examiner

JET REGULATOR COMPRISING AN IMPINGEMENT SURFACE HAVING RING WALLS

BACKGROUND

A jet regulator with a jet regulator housing, in the interior of which housing is provided a perforated plate with a plurality of throughflow holes for dividing up the water that flows through, wherein the perforated plate has a central, non-perforated impingement surface which is bordered at least by an annular wall, wherein the annular wall has passage openings oriented in a radial direction, and, on that side of the passage openings which is arranged in the impingement surface plane, there is provided in each case one throughflow hole, which is connected to the passage openings and runs through the perforated plate, and the annular wall is surrounded at the outer circumferential side by a ring-shaped annular chamber.

A jet regulator of this kind is described in the earlier German patent application 10 2012 021 361.1 and has proven useful.

In this jet regulator, the flow rate of water is proportional to the prevailing water pressure, such that, at a high pressure, a great deal of water, in some cases too much water, is able to flow through the jet regulator, i.e. the water consumption becomes unfavorable.

U.S. Pat. No. 3,851,825 A has already disclosed a jet regulator with a sleeve-shaped jet regulator housing which, on its outer circumferential edge at the inflow side, bears an external thread with which the jet regulator housing can be screwed onto an internal thread provided on the inner circumference in the water outlet of a sanitary outlet fitting. The previously disclosed jet regulator has a plate-shaped jet splitter which, on its inflow side, bears annular walls which are arranged concentrically with respect to each other and which extend through passage openings that are oriented in the radial direction and that intersect throughflow holes that extend axially through the plate-shaped jet splitter. In these throughflow holes, the inflowing water is divided into a multiplicity of individual jets. Since the throughflow holes represent a cross-sectional narrowing of the throughflow cross section, the individual jets in these throughflow holes experience an increase in speed, which is also barely reduced by the subsequently arranged metal screen that forms the outlet face of the previously disclosed jet regulator.

There is therefore the object of making available a jet regulator which is of the type defined at the outset and in which the advantages of a well-aerated water jet are possible without too large a quantity of water flowing through at a relatively high pressure.

SUMMARY

This object is achieved one or more and features of the invention.

According to the invention, the jet regulator defined at the outset is characterized in that, upstream of the impingement surface as viewed in the flow direction of the water or above the impingement surface, there is provided a throttle device and/or a flow rate regulator with a pass-through opening, and in that the impingement surface has, within the first annular wall, a second annular wall which is spaced apart radially from said first annular wall and which is of smaller diameter.

Thus, according to the invention, an excessive or increased consumption of water is counteracted by a throttle device integrated in the jet regulator or by a flow rate regulator, wherein these devices can have a construction known per se, according to which the throttle device and/or the flow rate regulator have a pass-through opening that limits the pass-through flow rate. The quantity of water passing through a throttle device is throttled, and the quantity of water passing through a flow rate regulator is completely or substantially independent of the respective water pressure, such that, independently of this respective water pressure, an approximately constant quantity of water can pass through, or in any event a quantity of water not proportional to the water pressure. While a throttle device in each case throttles the quantity of water, a flow rate regulator can thus more effectively reduce or restrict the water consumption even at relatively high pressures.

The pass-through opening of the throttle device or of the flow rate regulator can have a preselected or predetermined pass-through cross section which, in the case of the throttle device, determines the throttling action and/or, in the case of the flow rate regulator, can be set autonomously or automatically to a pass-through flow rate by an above sealing ring or O-ring which is deformable by means of water pressure. Flow rate regulators of this kind are known per se, and their pass-through opening is generally formed by annularly arranged individual openings between which holding webs extend, which may also be the case similarly in a pass-through opening for a throttle device. Thus, the pass-through opening has a substantially circular profile about the longitudinal central axis of the jet regulator, such that a flow of water thus distributed uniformly about a circular ring is possible.

The second annular wall can be arranged downstream of the pass-through opening as viewed in the flow direction or below the pass-through opening, and outside the coaxial projection of this pass-through opening as viewed in the radial direction.

It is advantageous if the second annular wall has radial passage openings arranged at a distance above the impingement surface or has an edge which runs parallel to the impingement surface and over which the water can flow.

The water, which is regulated in terms of its quantity by the throttle device or the flow rate regulator provided according to the invention, can thus hit the impingement surface and then fill the second annular wall, provided according to the invention, initially as far as the height of its passage openings or of its upper edge and, due to the water continuing to flow in, can then enter the space between the two annular walls and there flow into the passage openings and over the first annular wall, such that the water passes from both sides into the passage openings and from there into the throughflow holes and forms a regular outwardly flowing jet, which can be mixed with ambient air. Thus, even at different water pressures, it is always substantially the same quantity of water, or at least a throttled quantity of water, that is obtained at the outlet of this jet regulator.

To ensure that the inflowing water passes into the passage openings of the outer, first annular wall as far as possible from both sides and with approximately equal pressure and then neutralizes within these passage openings to such an extent that it can flow off approximately vertically downward through the throughflow holes and forms a substantially uniform vertical, downwardly directed stream, the annular chamber situated outside the first annular wall can be constricted in its profile around the first annular wall in regions, in such a way that regions which are relatively narrow in the radial direction and regions which are relatively wide in the radial direction alternate in the circumferential direction. The water flowing over the first annular wall can thus be influenced, in terms of its quantity and flow velocity, such that it passes with the desired pressure from the outer side of the first annular wall into the corresponding passage opening, where it meets the water coming from the inner side of the annular wall and, together with this water, then flows off downward through the corresponding throughflow hole.

In one expedient embodiment, provision can be made that, on the outer side of the first annular wall, protrusions are provided at least between some or between all of the passage openings arranged in this annular wall, said protrusions protruding in the radial direction into the annular chamber outside the first annular wall and thus forming narrowings of this outer annular chamber.

The annular chamber in this way has a greater width in the area of the passage openings and, at the same time, the protrusions situated on both sides of these passage openings can promote the supply of the water, which has reached the outer annular chamber, to the passage openings.

In order to convey the water as uniformly as possible, it is expedient if the passage openings are arranged centrally between two adjacent protrusions, and the protrusions are preferably in each case at the same distance from a passage opening adjacent to them. It is also expedient if all of the protrusions have corresponding dimensions and forms. Since the water already passes into the jet regulator through the throttle device or the flow rate regulator, and their circular pass-through opening, substantially concentrically with respect to the longitudinal central axis, the above-described features and measures afford the possibility that the water, also at the annular walls and at the entry to the passage openings, is in each case distributed substantially uniformly about the circumference of the jet regulator and can pass in substantially identical quantities into the passage openings. All of these measures in combination have the effect that, with the aid of a throttle device and especially with the aid of a flow rate regulator provided and designed according to the invention, the quantity of water flowing through the jet regulator can be limited even at a relatively high pressure.

The protrusions on the outer side of the first annular wall can be connected to the latter in a jointless or in particular integral fashion and project beyond the first annular wall preferably in the axial direction counter to the flow direction of the supplied water. The contribution of these protrusions is thus that the water flowing over the first annular wall is already divided up and guided toward the passage openings.

It may be expedient if the protrusions, which act as backing-up elements for the water passing over the first annular wall, take up approximately one third of the radial dimension or width of the outer annular chamber in the radial direction and are preferably angled, or if appropriate rounded, at their end remote from the first annular wall. The protrusions arranged in the outer annular chamber can thus be designed such that the quantities of water located on both sides of the first annular wall and entering the passage openings are of approximately identical size.

For ensuring good distribution of the water and for supplying the regulated quantity of water to the passage openings, it is expedient if the lower edges of the radial passage openings arranged in the second annular wall at an axial distance above the impingement surface, or the upper edge of the second annular wall (of smaller diameter than the first annular wall), are or is arranged at the same height as or higher than the upper delimitations of the passage openings in the first annular wall. This measure has the effect that the water flowing from the impingement surface through the radial passage openings of the second annular wall flows across sufficiently safely and in sufficient quantity in order to divide this water up in the desired manner for entry on both sides to the passage openings of the first annular wall, and therefore to the throughflow holes, and in order to avoid a substantially direct flow from the impingement surface to the inner side of the first annular wall. By means of the stated measures, it is possible to achieve a better equilibrium of the flow from inside and from outside into the passage openings of the first annular wall and thus into the throughflow holes.

The lower edges of the passage openings in the second annular wall or the upper edge of the second annular wall and/or the upper delimitations of the passage openings in the first annular wall can expediently be arranged in a common plane or two parallel planes lying at right angles to the longitudinal central axis of the jet regulator, i.e. they extend substantially rectilinearly in a respective diameter plane. The inflowing quantity of water can accordingly be divided up and conveyed onward.

It has already been mentioned that the second annular wall provided according to the invention is effective by virtue of the fact that it is arranged in the radial direction outside the projection of the pass-through opening through the throttle device or through the flow rate regulator which is particularly effective in terms of saving water.

In an effective and expedient embodiment, provision can be made that the sealing ring or O-ring arranged on the flow rate regulator in a groove with the pass-through opening is arranged above the second annular wall, and in particular parallel to the latter, as viewed in the axial direction, that the projection of the pass-through opening onto the impingement surface is arranged within the second annular wall, that the radial dimension of the groove which receives the sealing ring or O-ring is in particular greater than that of the second annular wall, and that the pass-through opening is arranged in that region of the groove which projects inward in the radial direction beyond the second annular wall, or that the projections of the groove with the sealing ring or O-ring and the pass-through opening onto the impingement surface are arranged within the second annular wall. Especially in the latter alternative, it is irrelevant whether the sealing ring or O-ring within the groove bears on the outer wall thereof in the starting position and the pass-through opening is located more in the inner region, or vice versa. The sealing ring bearing on an outer wall of a groove can have greater effectiveness here since its diameter is correspondingly large and it can interact with an inwardly lying pass-through opening of suitably smaller diameter.

By means of the arrangement described above, it is possible to ensure that the water jet reaching the impingement surface strikes this impingement surface within the second annular wall and can flow outward from there. At the same time, the quantity of this water can be influenced with the aid of the sealing ring or O-ring, depending on the water pressure, and can be maintained at the same level in a manner at least substantially independent of this water pressure or, if a throttle device is used, can at least be throttled.

The passage openings provided on the second annular wall can each have lateral delimitations which end freely in the upward direction counter to the flow direction of the supplied water. These radial passage openings in the second annular wall can be closed off in the upward direction by the underside of the flow rate regulator or throttle device resting thereon. Thus, the flow rate regulator or the throttle device can also have an additional function, namely that of delimiting the radial passage openings in the second annular wall.

DE 20 2010 007 835 U has already disclosed a flow rate regulator by means of which the volume of water flowing through per unit of time is to be regulated to a fixed maximum value in a manner independent of pressure. This flow rate regulator has a regulator housing, which has an outer circumferential edge area to be mounted on the inflow-side front circumferential edge area of an outflow-side jet regulator and/or of a sieve attachment.

NL 122 340 C has already disclosed a jet regulator which can be mounted on the water outlet of a sanitary outlet fitting, which jet regulator has a jet splitter formed by two perforated plates lying at a distance one above the other. On their inflow sides, these perforated plates each carry a structure formed by concentrically encircling protuberances and indentations. Since the throughflow holes provided in these perforated plates represent a cross-sectional narrowing, the individual jets generated in these throughflow holes are accelerated in such a way that a negative pressure forms on the outflow side of the jet splitter, which negative pressure sucks in the ambient air that is to be mixed with the individual jets.

U.S. Pat. No. 3,363,841 A has already disclosed a jet regulator, with a plate-shaped jet splitter provided in the jet regulator housing. This jet splitter has a multiplicity of throughflow holes, which are arranged in circular trajectories concentric to each other. Along these circular trajectories, annular walls are provided on the inflow side of the plate-shaped jet splitter, which annular walls each have, in the area of the throughflow holes, a wall aperture open in the radial direction. The throughflow holes of this jet splitter are also intended to accelerate the individual jets generated in these throughflow holes, in such a way that a negative pressure arises on the outflow side of the jet splitter, by means of which negative pressure the ambient air that is to be mixed with the individual jets is sucked into the jet regulator housing.

There is therefore also the object of making available a jet regulator with which it is possible to generate a sufficiently aerated, sparkling and soft jet of water, but one that still appears as voluminous as possible, even at a relatively low throughflow rate of the water and at relatively high pressures.

In a jet regulator having a jet regulator housing, in the interior of which housing is provided a perforated plate with a plurality of throughflow holes for dividing up the water that flows through, of which at least one throughflow hole, at least in an outflow-side hole portion, widens in a tapered or conical or stepped manner toward its outflow side, this object is achieved according to the invention by the fact that, on the outflow side of the perforated plate and at a distance from the latter, there is provided an encircling impingement chamfer which narrows the clear housing cross section in this region progressively in the flow direction.

Since at least one throughflow hole or all throughflow holes in the perforated plate of the jet regulator according to the invention widen(s), at least in an outflow-side hole portion, in a tapered or conical or stepped manner toward the outflow side, the water flowing through the throughflow holes can be spread out in an approximately tapering or conical shape and, even at relatively low throughflow rates, is able to mix, practically across the entire housing cross section of the jet regulator housing, with the ambient air that is sucked into this jet regulator housing. Since an encircling impingement chamfer is provided on the outflow side of the perforated plate, and at a distance from the latter, and narrows the clear housing cross section in this region progressively in the flow direction, the water emerging from the throughflow holes and already enriched with air strikes an impingement chamfer upstream or downstream of the perforated plate, and the water already prepared in this way is additionally mixed and divided up before the water thus enriched with air is able to emerge from the jet regulator as a homogeneous, non-sputtering but sparkling and soft jet of water.

Here, the effective mixing of air with the through-flowing water is additionally promoted, even in the case of low throughflow rates and the water pressure reduced by the flow rate regulator, if at least one throughflow hole, at least in an outflow-side hole portion, widens in a tapered or conical manner toward its outflow side in such a way that the individual jet or spray jet which emerges from the throughflow hole, and which widens owing to the tapered shape or conicity, mixes in the housing interior with the individual jet of at least one adjacent throughflow hole, preferably before individual jets impinge on at least one jet-forming part arranged in the housing interior.

In a particularly easy to produce embodiment according to the invention, provision can be made that the impingement chamfer forms the inflow side of a wall portion which is formed as at least one constriction that undulates as viewed in longitudinal section. Here, the impingement chamfer can be in the form of a protuberance on the inner circumference, or projection on the inner circumference, of the housing circumferential wall, and can be integrally connected to the jet regulator housing or to a jet regulator housing part.

What is preferable, however, is an embodiment in which the impingement chamfer is formed as a wall portion of an annular or sleeve-shaped insert part that can be inserted into the jet regulator housing.

In order that at least one jet-forming part can be inserted into the housing interior of the jet regulator housing and that the flow rate regulator according to the invention can be easily fitted, it is advantageous if the jet regulator housing is formed in multiple parts and has at least two housing parts that are preferably detachably connectable to each other.

The throughflow holes provided in the perforated plate can be arranged in the form of one or more concentric circles of holes. The perforated plate has the aforementioned central non-perforated impingement surface, which is bordered by the annular walls.

The water diverted in the region of the annular walls, in particular of the first outer annular wall, is initially slowed down, deflected to the side and mixed by way of partial flows flowing toward one another in opposite directions, before said water can flow through the throughflow holes of the perforated plate and can emerge, on the outflow side of the perforated plate, in the form of a corresponding number of spray cones. This can also be achieved, substantially independently of the pressure of the inflowing water, by means of the flow rate regulator being provided according to the invention above the impingement surface and the annular walls.

In order that the water which is mixed with ambient air, and correspondingly made turbulent, in the housing interior of the jet regulator housing can be formed into a homogenous overall jet again at the outflow side of the jet regulator, and in order that the water emerging from the jet regulator can be formed into a non-sputtering emerging water jet in an outflow-side homogenizing device, irrespective of the fact that the water can enter the jet regulator at different pressures, it is expedient if the outflow-side end surface of the jet regulator housing is formed by a mesh or honeycomb structure, and if the mesh or honeycomb structure that forms the outflow-side end surface is either non-detachably connected to and/or in particular formed integrally with the jet regulator housing or formed by an inlay part that can be inserted into the jet regulator housing. The stated effect on the shaping of the outflow-side overall jet can then advantageously take place independently of the pressure of the inflowing water since, according to the invention, a flow rate regulator is provided in the described manner upstream of or above the impingement surface in the flow direction of the water.

The homogenization of the overall jet emerging from the jet regulator is further promoted if the mesh or honeycomb structure forming the outflow-side end surface of the jet regulator housing is formed by webs which, at least in an outflow-side subregion, narrow in the flow direction.

In a preferred development of the jet regulator according to the invention, provision can be made that the jet regulator is configured as an aerated jet regulator which has at least one aeration opening that opens out in the housing interior on the outflow side of the perforated plate and that connects the housing interior to the atmosphere. In order to ensure that the at least one aeration opening can connect the housing interior to the atmosphere, it is possible for at least one aeration duct, which is designed to be open to the atmosphere, to be provided in a double-walled subregion of the jet regulator housing or in an annular gap bordering the jet regulator housing.

Especially by combination of one or more of the above-described features and measures, a jet regulator is obtained in which the advantages of a well-aerated water jet are achieved by one or more measures and features, this also being possible in the arrangement of a flow rate regulator, without an unnecessarily large quantity of water being needed at a high water pressure.

BRIEF DESCRIPTION OF THE DRAWINGS

Illustrative embodiments of the invention are described in more detail below with reference to the drawing in which, in some cases schematically.

DETAILED DESCRIPTION OF THE PREFERRED EMBODIMENTS

In the illustrative embodiments described below, parts that correspond in terms of their function retain the same reference numbers even in a modified configuration.

A jet regulator designated in its entirety by 1 usually has, more or less analogously to the patent application DE 10 2012 021 661.1, a jet regulator housing (not shown in detail), or it fits into such a jet regulator housing, and, in order to secure the jet regulator to a water outlet, the jet regulator housing can have an external thread or, in a protruding part, can have an internal thread.

Figure 1:
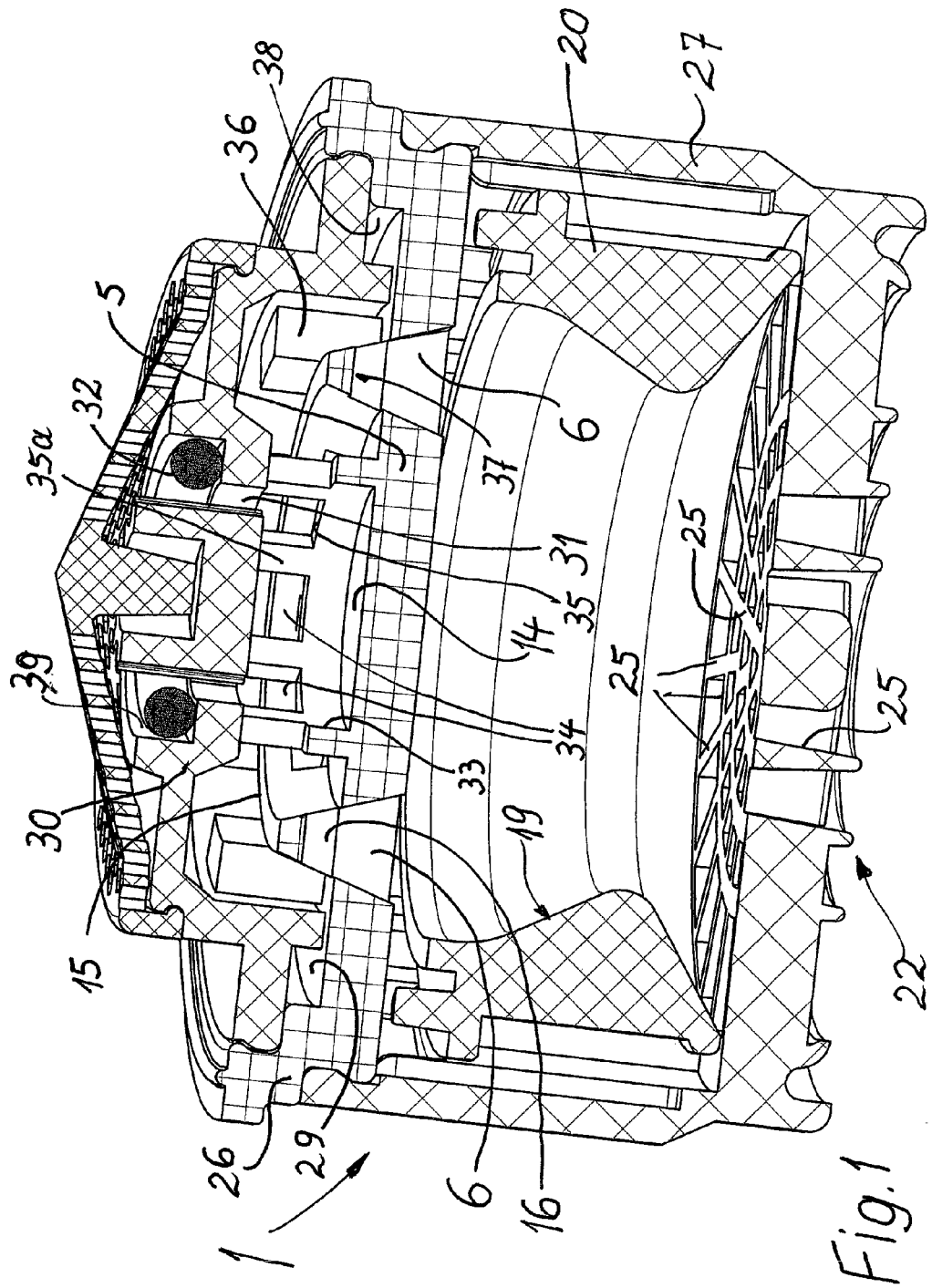
FIG. 1 shows a perspective partial longitudinal section through a jet regulator according to the invention which, with an outflow-side housing part, fits into a jet regulator housing (not shown), and which has a perforated plate with a central impingement surface and two annular walls concentrically surrounding the latter, and also throughflow holes and, in the flow direction of the water, a flow rate regulator above the perforated plate.
Figure 4:
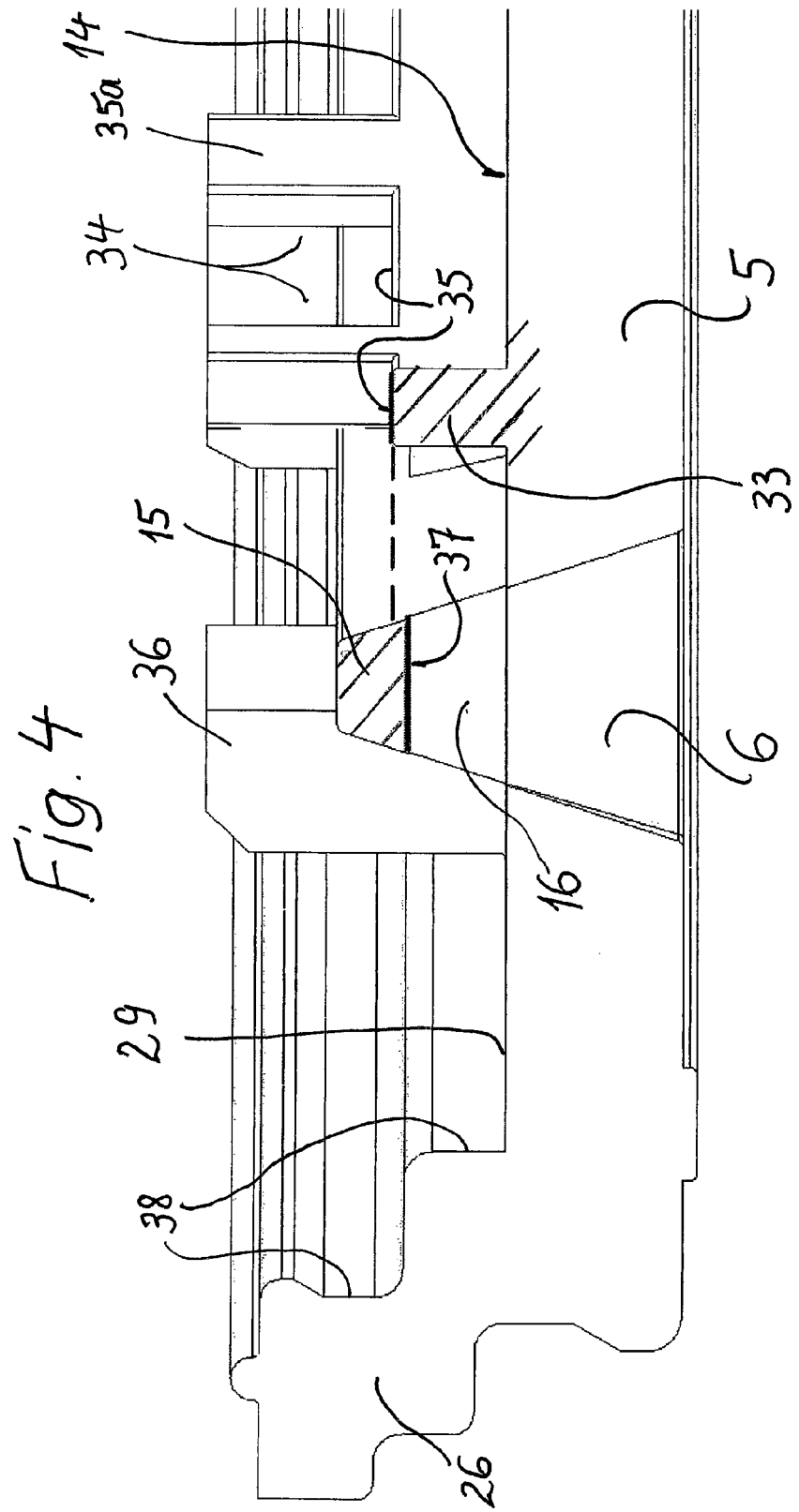
FIG. 4 shows a partial longitudinal section through the perforated plate with the inflow-side housing part, wherein the passage openings of the two annular walls arranged concentrically with respect to each other are adjacent to each other and are depicted clearly in terms of their mutual relative height position.
Figure 5:
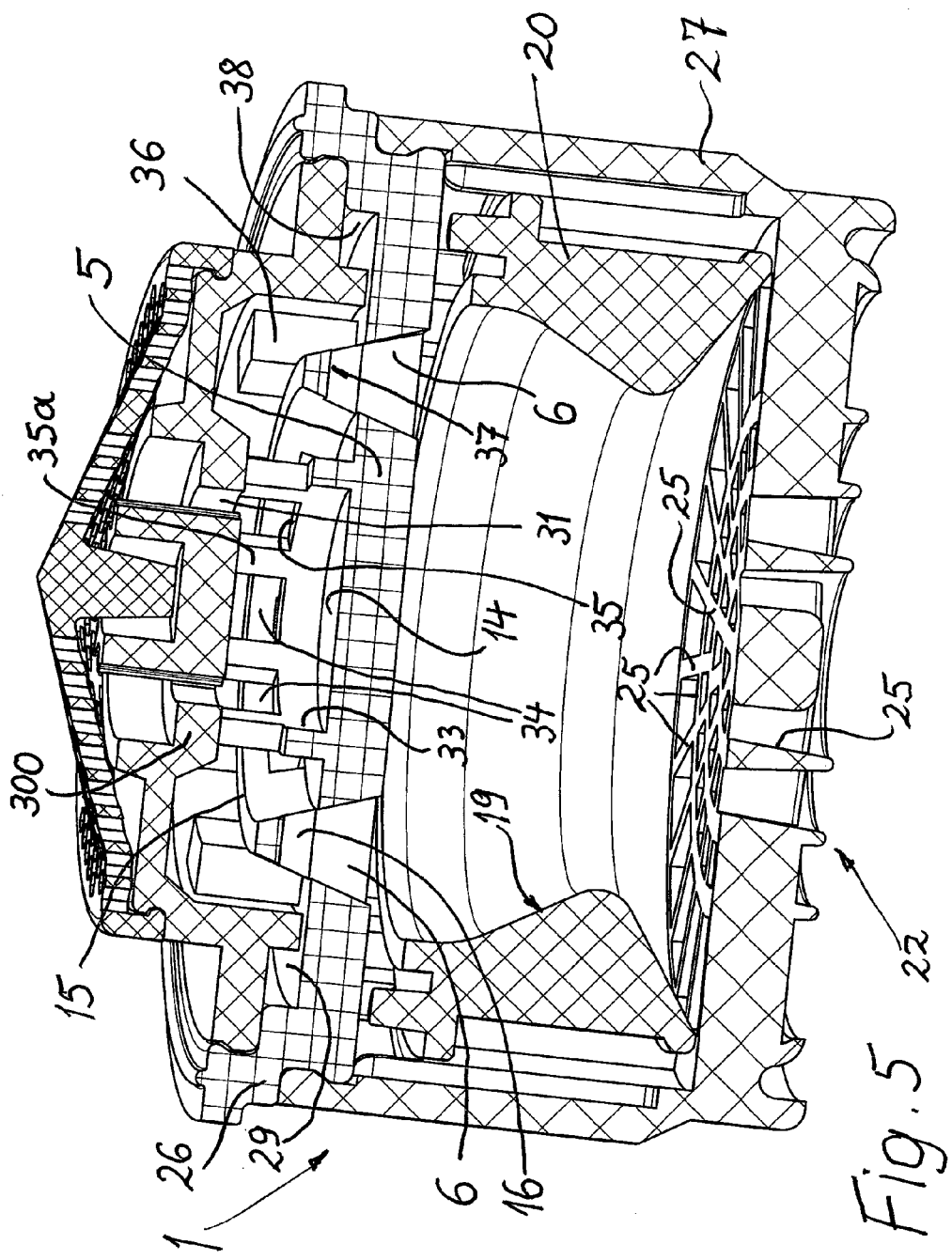
FIG. 5 shows a view, corresponding to FIG. 1, of a modified illustrative embodiment of a jet regulator according to the invention which, instead of a flow rate regulator, has a throttle device above the perforated plate.

According to FIGS. 1 and 5, a perforated plate 5 provided in the housing interior has a plurality of through-flow holes 6, which can be seen in FIG. 1 and which extend in the vertical direction and serve to divide up the water that flows through. The perforated plate 5 has a central, non-perforated impingement surface 14, concentric to which there extends an outer first annular wall 15, the latter having passage openings 16 which are oriented in the radial direction and, according to FIGS. 1, 4, 5 and 6, pass through the entire cross section of the annular wall 15.

On that side of the passage openings 16 which is arranged in the impingement surface plane, there are provided the throughflow holes 6 which are connected to these passage openings 16 and which run through the perforated plate 5. The annular wall 15 is surrounded at the outer circumferential side by a ring-shaped annular chamber 29 and by an inflow-side housing part 26 which, in the illustrative embodiment, is integrally connected to the perforated plate 5.

Figure 2:
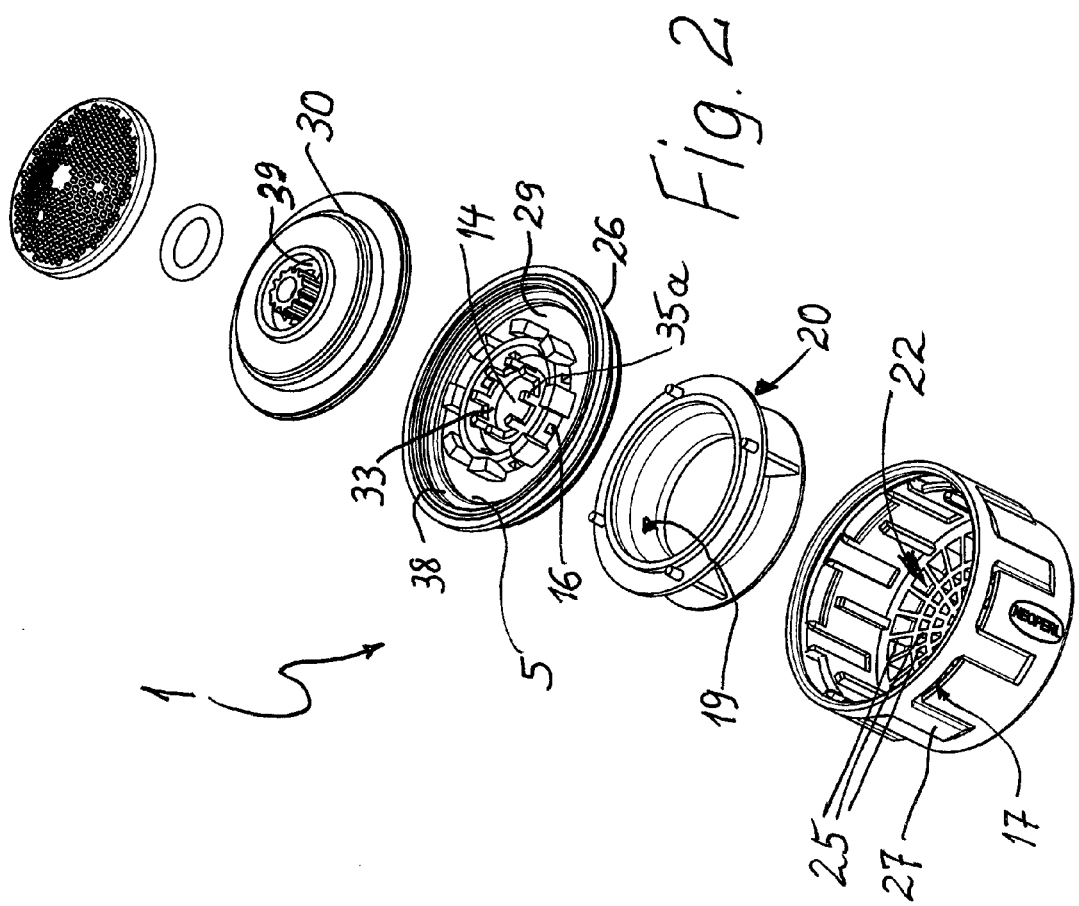
FIG. 2 shows the jet regulator from FIG. 1 in an exploded perspective view of the individual parts.

According to FIGS. 1 and 2, a flow rate regulator designated overall by 30 is provided upstream of the impingement surface 14 as viewed in the flow direction of the water or above the impingement surface 14 and has a circular pass-through opening 31, which is expediently interrupted by webs and thereby held together. The throughflow cross section of this pass-through opening 31, which results in a substantially circular flow of water, interacts with a sealing ring 32 or O-ring, which is arranged above and is deformable by means of water pressure, in such a way that the throughflow cross section of the pass-through opening 31 can be reduced by the deformation of this sealing ring 32 by the water pressure, such that, in the event of a relatively high water pressure, the throughflow rate can be limited or set autonomously or automatically despite this relatively high water pressure.

To form a visibly sparkling and voluminous jet of water, a second annular wall 33 surrounding the impingement surface 14 is provided on the perforated plate 5 according to FIGS. 1 to 6, which second annular wall 33 is located below the pass-through opening 31 and in the radial direction outside the coaxial projection of this pass-through opening 31 inside the first annular wall 15, spaced apart radially from said first annular wall 15, and which therefore has a smaller diameter than the first annular wall 15. Moreover, this second annular wall 33 has a smaller diameter than the circular pass-through opening 31 arranged above the impingement surface 14.

Figure 3:
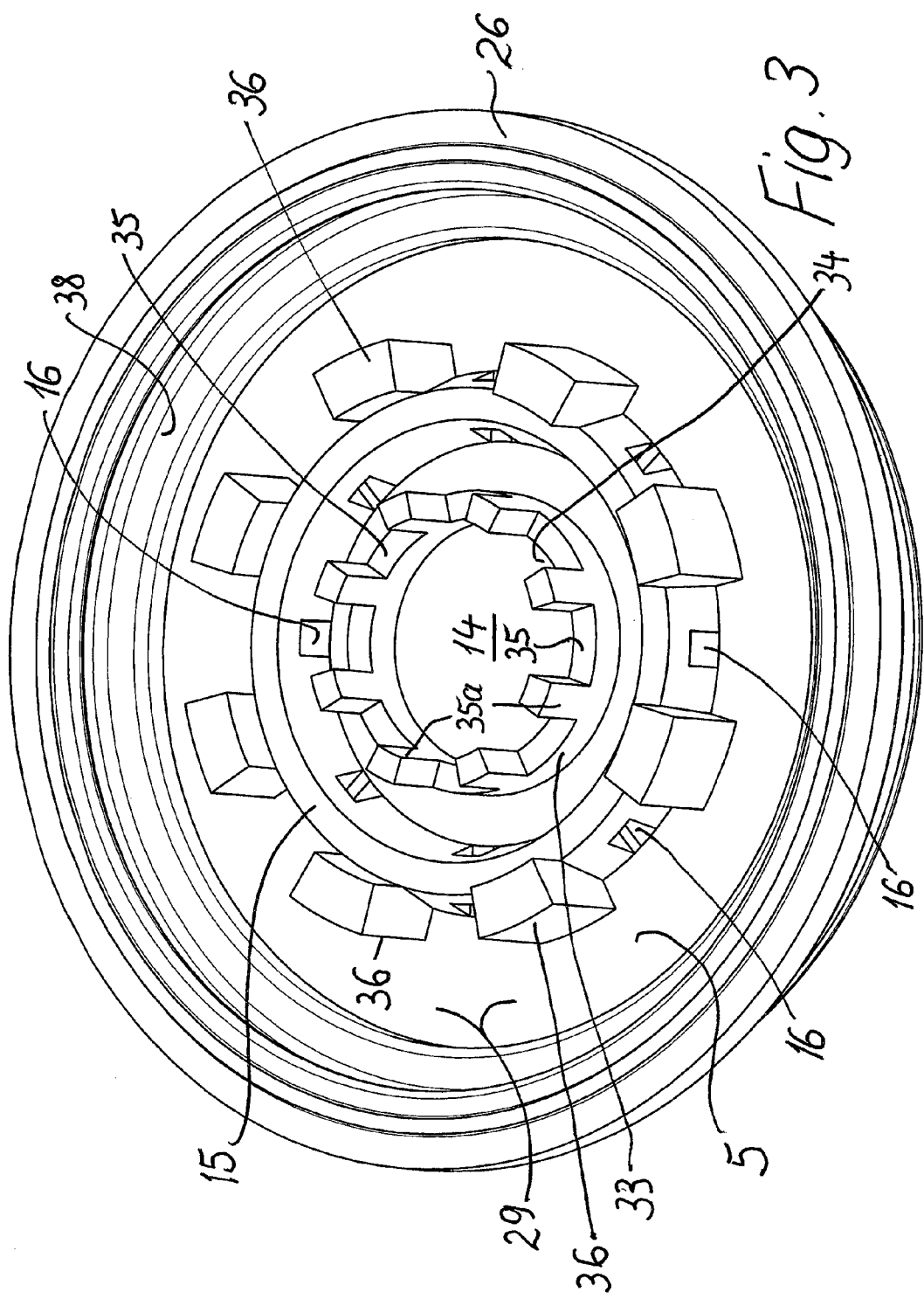
FIG. 3 shows a perspective plan view of the perforated plate with its central impingement surface, the two annular walls concentrically surrounding it, and an inflow-side housing part integrally connected to the perforated plate and connectable to the outflow-side housing part.

This second annular wall 33 of smaller diameter has passage openings 34 which are likewise arranged in the radial direction and which, as can be seen particularly clearly in FIGS. 1, 3 and 4, are located with their lower edge 35 at a distance from the impingement surface 14, i.e. their lower edge 35 is arranged above the impingement surface 14. When it has reached this lower edge 35, the inflowing water can thus pass through these passage openings 34 in the radial direction into the space between the first annular wall 15 and the second annular wall 33.

Looking at FIG. 3 in particular, which shows an oblique plan view of the impingement surface 14 and of the two annular walls 15 and 33 arranged concentrically thereto, it will be seen that an annular chamber 29 is provided outside the first, larger annular wall 15, which annular chamber 29, although ring-shaped at the outer circumference, is constricted in its profile around the first annular wall 15 in regions, in such a way that individual regions which are relatively narrow in the radial direction and regions which are relatively wide in the radial direction alternate in the circumferential direction. The wider regions are each arranged where radially oriented passage openings 16 are provided on this annular wall 15. To achieve this, protrusions 36 are provided on the outer side of the first annular wall 15, between all of these passage openings 16 arranged in said annular wall 15, said protrusions protruding outward in the radial direction into the annular chamber 29 and thus forming narrowings of this outer annular chamber 29 and each being at the same distance from an adjacent passage opening 16. The passage openings 16 are thus in each case arranged centrally between two adjacent protrusions 36, which for their part have corresponding dimensions and forms.

These protrusions 36 on the outer side of the first annular wall 15 are connected to the latter in a jointless and preferably integral fashion and project beyond the first annular wall 15 in the axial direction counter to the flow direction of the supplied water, almost by the overshoot of the first annular wall 15 relative to the impingement surface 14 and the bottom limit of the annular chamber 29.

Moreover, these protrusions 36, which act as backing-up elements for the water passing over the first annular wall 15, take up approximately one third of the radial dimension or width of the outer annular chamber 29 in the radial direction and, in the illustrative embodiment, are angled at their end remote from the first annular wall 15, although they could also be rounded if appropriate. Their bottom limit, like the upper parallel end limit, has the shape of an arc of a circle, wherein the center of curvature of the respective arc of a circle is arranged in the center of the impingement surface 14, i.e. the passage of the imaginary central axis of the jet regulator 1. The arc sections at the edge of the protrusions 36 directed away from the center are therefore arranged concentrically with respect to the annular walls 15 and 33 and limit corresponding cylinder sections as vertical boundary surfaces of these protrusions 36 on the side directed away from the annular walls.

It will be seen especially from FIG. 4, but also from FIG. 1, that the lower edges 35 of the radial passage openings 34 arranged in the second annular wall 33 at a distance above the impingement surface 14 are arranged higher than the upper delimitation 37 of the passage openings 16 in the first annular wall 15. As a result of this initially uninterrupted form of the second, inner annular wall 33, the inflowing water first has to reach a certain height before it can flow off radially toward the sides. A direct flow into the passage openings 16 in the first annular wall 15 from the inside is thus prevented, such that the water also flowing partly over the first annular wall 15 can enter the passage openings 16 both from the inside and also from the outside, substantially in equilibrium, and thereafter, as a result of the mutual neutralization of the flow directions and forces, can pass approximately vertically into the throughflow holes 6 and flow through these.

It will also be seen from said figures that the lower edges 35 of the passage openings 34 in the second annular wall 33 and also the upper delimitations 37 of the passage openings 16 in the first annular wall 15 are arranged in two parallel planes, lying at right angles to the longitudinal central axis of the jet regulator 1, and run in a planar fashion. It would also be conceivable for them to be arranged in a common plane and then lie at the same height.

The passage openings 34 provided on the second annular wall 33 each have rectilinear and axially parallel lateral delimitations 35a which end freely in the upward direction counter to the flow direction of the supplied water according to FIGS. 3 and 4, whereas in FIG. 1 they are closed off in the upward direction by the underside of the flow rate regulator 30 resting on these ends. This inflow-side housing part 26, comprised of the perforated plate 5 with the impingement surface 14, the annular walls 15 and 33 and the outer annular chamber 29, and also by an outer encircling closure wall 38, can thus be produced, particularly in one piece, relatively easily and inexpensively.

The sealing ring 32, preferably an O-ring, arranged on the flow rate regulator 30 in a groove 39 at the bottom of the pass-through opening 31 is arranged above the second annular wall 33, as viewed in the axial direction, and parallel thereto, and, according to FIG. 1, is practically coaxial with respect to the second annular wall 33. However, the radial dimension of this groove 39 receiving the sealing ring 32 is greater than that of the second annular wall 33, and the pass-through opening 31 is located in that region of the groove 39 which projects inward in the radial direction beyond the second annular wall 33. The diameter of the annular pass-through opening 31, which is expediently composed of individual openings arranged alongside one another in a circle, is therefore smaller than the internal diameter of the second annular wall 33. This ensures that the water passing through the pass-through opening 31 to the impingement surface 14 gains access only within the second annular wall 33.

From there, it can then pass over the lower edges 35 of the passage openings 34 of the second annular wall 33 into the space between the two annular walls and in part over the first, outer annular wall 15 into the outer annular chamber 29 and, in the manner already described, can enter from both sides into the passage openings 16 of the first, outer annular wall 15 and reach the downwardly directed throughflow holes 6, wherein the streams of water entering the passage openings 16 from both sides meet in the interior of these passage openings 16 and thus flow downwards into the throughflow holes 6.

It will be seen from FIGS. 1, 4 and 5 that at least one throughflow hole 6 of the perforated plate 5 widens, or all through-flow holes 6 according to FIGS. 1 and 5 widen, at least in an outflow-side hole portion, in a tapered or conical manner toward the outflow side. A stepped widening would also be conceivable.

In all of the illustrative embodiments shown, the throughflow holes 6 provided in the perforated plate 5 are intended to divide up the water that flows through. As a result of the tapered or conical spreading of the water emerging from the perforated plate 5, preferably along the entire length of the through-flow holes 6, the water can mix with the ambient air sucked into the jet regulator practically over the entire cross section of the jet regulator, even in the case of low throughflow rates and low water pressures, as are also formed by the flow rate regulator 30 in this area.

The throughflow holes 6 widen in a tapered or conical manner in such a way that the water jet emerging from the throughflow holes 6 and widening owing to the tapered shape or conicity mixes in the housing interior with the individual jet of at least one adjacent throughflow hole 6, preferably before individual jets impinge on jet-forming parts arranged in the housing interior.

As a result of the aforementioned diversion of the inflowing water and its entry from both sides into the passage openings, this inflowing water is slowed down in the region of the throughflow holes 6 and, as a consequence of the narrowing of the throughflow cross section in the throughflow holes 6, is accelerated again. In accordance with Bernoulli's equation, this increase in speed results in a negative pressure being generated on the outflow side of the perforated plate 5, which negative pressure allows ambient air to be sucked into the housing interior of the jet regulator 1. For this purpose, the housing circumferential wall of the outflow-side housing part 27 is provided with aeration openings 17 (FIG. 2) through which ambient air can enter and be entrained by the water.

It will be seen in particular from FIGS. 1 and 5 that, on the outflow side of the perforated plate 5 and at a distance from the latter, there is provided an encircling impingement chamfer 19 which narrows the clear housing cross section in this region progressively in the flow direction. This impingement chamfer 19 forms the inflow side of a circular wall portion which is formed as at least one constriction that undulates in the longitudinal direction as viewed in longitudinal section. The wall portion having the impingement chamfer 19 is configured here as a ring-shaped or sleeve-shaped insert part 20 that can be inserted into the jet regulator housing.

In an embodiment not shown, the impingement chamfer 19 could be formed integrally on the housing inner circumference of the outflow-side housing part 27. By contrast, provision is made in the illustrative embodiment that the perforated plate 5 is formed integrally in the housing interior of the inflow-side housing part 26. The jet regulator housing can thus be formed in multiple parts and has at least two housing parts 26 and 27 that are detachably connectable to each other in particular.

FIGS. 1, 2 and 5 show that the outflow-side end surface of the jet regulator according to the invention is formed by a mesh or honeycomb structure 22, and that the mesh or honeycomb structure 22 forming the outflow-side end surface is non-detachably connected to, and in particular formed integrally on, the outflow-side housing part 27 of the jet regulator. However, it could also be formed by an insertable inlay part.

According to FIGS. 1, 2 and 5, the mesh or honeycomb structure 22 forming the outflow-side end surface of the jet regulator is formed by webs 25 which narrow in the flow direction, at least in an outflow-side subregion according to FIG. 1.

Overall, the jet regulator 1 is configured as an aerated jet regulator which, as has already been mentioned, has aeration openings 17 which open out in the interior of the jet regulator housing on the outflow side of the perforated plate 5 and which connect the housing interior to the atmosphere.

In the illustrative embodiment according to FIG. 5, practically all details and parts are shown in a form and arrangement corresponding to FIG. 1. The relevant description of the reference numbers contained in FIG. 5 corresponds to the description of FIG. 1. In contrast to FIG. 1, a throttle device 300 is provided, instead of a flow rate regulator 30, upstream of the impingement surface 14, as viewed in the flow direction of the water, and over the impingement surface 14. This throttle device 300 is formed by the fact that no sealing ring 32 or O-ring is contained in the groove 39, such that the water can pass through this groove 39 and the pass-through opening 31 to the impingement surface 14. The flow then continues from there, in the manner already described, to the passage openings 16 and to the throughflow holes 6.

Figure 6:
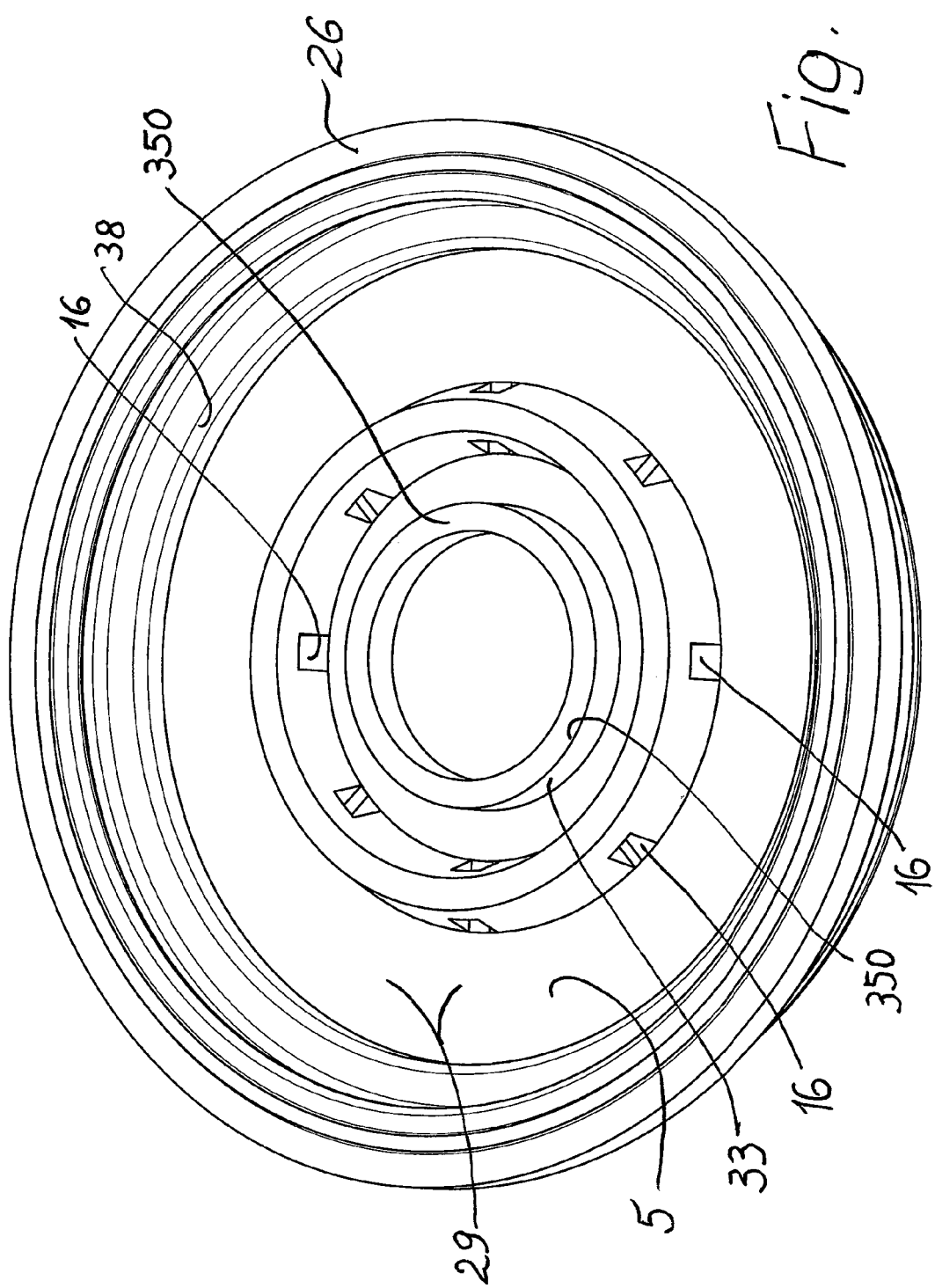
FIG. 6 shows a perspective plan view, corresponding to FIG. 3, of a modified perforated plate with central impingement surface and two concentrically arranged annular walls, wherein the inner annular wall, having a smaller diameter, is delimited at the top in the axial direction by an upper peripheral edge.

FIG. 6 shows modifications of the perforated plate 5. The second annular wall 33 has no passage openings 34 arranged at a distance from the impingement surface 14, and instead it is delimited all the way round at the top by an upper edge 350 which, in terms of its function, corresponds in practice to the lower edge 35 of the passage openings 34 of the illustrative embodiment according to FIGS. 3 and 4. The edge 350 thus has the same position relative to the upper delimitation 37 of the passage openings 16 in the first annular wall 15, i.e. it can thus be arranged in a corresponding plane or in a higher plane.

The production of this perforated plate 5 is made simpler by the fact that it is free of protrusions 36 on the outer side of the first annular wall 15, although such protrusions 36 could also be provided.

Optionally, the second annular wall 33 could be designed with passage openings 34 and the first annular wall 15 without protrusions 36, or the second annular wall 33 could be designed with an edge 350 delimiting it at the top and the first annular wall 15 could be designed with or without protrusions 36.

As is shown in FIG. 3, all of the protrusions 36 could have corresponding dimensions and forms and could each be at the same distance from the adjacent passage openings 16, in order to achieve flow conditions that are as uniform as possible.

The jet regulator 1, with a perforated plate 5 arranged in its interior and with throughflow holes 6 passing through said perforated plate 5 in order to divide up the water that flows through, has on the perforated plate 5 a central, non-perforated impingement surface 14 which is bordered by a first annular wall 15, wherein the annular wall 15 has passage openings 16 oriented in a radial direction and passing through it, wherein, on that side of the passage openings 16 which is arranged in the impingement surface plane, there is provided in each case one throughflow hole 6, which is connected to the passage openings 16 and runs through the perforated plate 5. The annular wall 15 is surrounded at the outer circumferential side by a ring-shaped annular chamber 29. Upstream of the impingement surface 14 as viewed in the flow direction of the water, a flow rate regulator 30 or a throttle device 300 is provided, as a result of which the water consumption is limited and/or the quantity of water becomes substantially independent of the respective water pressure. Moreover, a second annular wall 33 of smaller diameter is provided at a distance from the first annular wall 15, and coaxially and concentrically with respect to the latter, which second annular wall 33 has radial passage openings 34 which are arranged at a distance above the impingement surface 14 and through which the water has access to the first annular wall 15 and to the passage openings 16 and, consequently, to the throughflow holes 6.

As a result of this combination, the quantity of water flowing through the jet regulator is practically independent of the water pressure prevailing upstream of the jet regulator 1.

The invention claimed is:

1. A jet regulator (1) comprising a jet regulator housing having an interior in which there is provided a perforated plate (5) with a plurality of throughflow holes (6) for dividing up water that flows therethrough, the perforated plate (5) has a central, non-perforated impingement surface (14) which is bordered at least by an annular wall (15), the annular wall (15) has passage openings (16) oriented in a radial direction, and, on that side of the passage openings (16) which is arranged in an impingement surface plane, there is provided in each case one of the throughflow holes (6), which is connected to the passage openings (16) and runs through the perforated plate (5), the annular wall (15) is surrounded at an outer circumferential side thereof by a ring-shaped annular chamber (29), at least one of a throttle device (300) or a flow rate regulator (30) with a pass-through opening (31) located upstream of the impingement surface (14) as viewed in a flow direction of the water or above the impingement surface (14), and the impingement surface (14) has, within the first annular wall (15), a second annular wall (33) which is spaced apart radially from said first annular wall and which is of smaller diameter.

2. The jet regulator as claimed in claim 1, wherein the pass-through opening (31) has a preselected or predetermined pass-through cross section which, in the case of the throttle device (300), determines a throttling action or, in the case of the flow rate regulator (30), is set autonomously or automatically to a pass-through flow rate by a sealing ring (32) or O-ring which is deformable by water pressure.

3. The jet regulator as claimed in claim 1, wherein the second annular wall (33) is arranged downstream of the pass-through opening (31) as viewed in the flow direction or below the pass-through opening (31) and outside a coaxial projection of the pass-through opening (31) as viewed in the radial direction.

4. The jet regulator as claimed in claim 1, wherein the second annular wall (33) has radial passage openings (34) arranged at a distance above the impingement surface (14) or has an edge (350) which runs parallel to the impingement surface (14) and over which the water can flow.

5. The jet regulator as claimed in claim 1, wherein the annular chamber (29) situated outside the first annular wall (15) is constricted in profile around the first annular wall (15) in regions, in such a way that regions which are relatively narrow in the radial direction and regions which are relatively wide in the radial direction alternate in a circumferential direction.

6. The jet regulator as claimed in claim 1, wherein on the outer side of the first annular wall (15), protrusions (36) are provided at least between some or between all of the passage openings (16) arranged in the annular wall (15), said protrusions protruding in the radial direction into the annular chamber (29) outside the first annular wall and thus forming narrowings of said outer annular chamber (29).

7. The jet regulator as claimed in claim 6, wherein the passage openings (16) are arranged centrally between two adjacent protrusions (36), and the protrusions (36) are in each case at an equal distance from a passage opening (16) adjacent to them.

8. The jet regulator as claimed in claim 6, wherein all of the protrusions (36) have corresponding dimensions and forms.

9. The jet regulator as claimed in claim 6, wherein the protrusions (36) on the outer side of the first annular wall (15) are connected to the latter in a jointless or integral fashion and project beyond the first annular wall (15) in an axial direction counter to the flow direction of the supplied water.

10. The jet regulator as claimed in claim 6, wherein the protrusions (36), which act as backing-up elements for the water passing over the first annular wall (15), take up approximately one third of a radial dimension or width of the outer annular chamber (29) in the radial direction and are angled or rounded at ends thereof remote from the first annular wall (15).

11. The jet regulator as claimed in claim 4, wherein lower edges (35) of the radial passage openings (34) arranged in the second annular wall (33) at an axial distance above the impingement surface (14), or an upper edge (350) of the second annular wall (33), are or is arranged at the same height as or higher than an upper delimitation (37) of the passage openings (16) in the first annular wall (15).

12. The jet regulator as claimed in claim 11, wherein the lower edges (35) of the passage openings (34) in the second annular wall (33) or the upper edge (350) of the second annular wall (33) or the upper delimitations (37) of the passage openings (16) in the first annular wall (15) are arranged in a common plane or two parallel planes lying at right angles to a longitudinal central axis.

13. The jet regulator as claimed in claim 2, wherein the sealing ring (32) or O-ring arranged on the flow rate regulator (30) in a groove (39) with the pass-through opening (31) is arranged above the second annular wall (33), as viewed in the axial direction, a projection of the pass-through opening (31) onto the impingement surface (14) is arranged within the second annular wall (33), a radial dimension of a groove (39) which receives the sealing ring (32) or O-ring is greater than that of the second annular wall (33), and the pass-through opening (31) is arranged in a region of the groove (39) which projects inward in the radial direction beyond the second annular wall (33), or the projections of the groove (39) with the sealing ring (32) or O-ring and of the pass-through opening (31) onto the impingement surface (14) are arranged within the second annular wall (33).

14. The jet regulator as claimed in claim 4, wherein the passage openings (34) provided on the second annular wall (33) each have lateral delimitations (35a) which end freely in an upward direction counter to the flow direction of the supplied water, and said radial passage openings in the second annular wall (33) are closed off in an upward direction by an underside of the flow rate regulator (30) or throttle device (300) resting thereon.

* * * * *